Sept. 7, 1965

W. DIETZEL ETAL 3,205,095

SUGAR RECOVERY CENTRIFUGE

Filed July 12, 1963

INVENTOR.
WALTER DIETZEL
BY HEINRICH HILLEBRAND

Karl F. Ross
AGENT

Sept. 7, 1965  W. DIETZEL ETAL  3,205,095
SUGAR RECOVERY CENTRIFUGE
Filed July 12, 1963  4 Sheets-Sheet 4

WALTER DIETZEL
HEINRICH HILLEBRAND
INVENTOR.

BY  Karl F. Ross

AGENT

United States Patent Office 3,205,095
Patented Sept. 7, 1965

3,205,095
SUGAR RECOVERY CENTRIFUGE
Walter Dietzel, Braunschweig, and Heinrich Hillebrand, Supplingen, near Helmstedt, Germany, assignors to Braunschweigische Maschinenbauanstalt Braunschweig, Bahnhof, Germany
Filed July 12, 1963, Ser. No. 294,692
Claims priority, application Germany, Oct. 2, 1962, B 69,045
8 Claims. (Cl. 127—19)

This application is a continuation-in-part of our copending application Serial No. 239,741, filed November 23, 1962.

Our present invention relates to continuous centrifuges for the separation of solid matter from liquid material in a fluent mixture, and, more particularly, to centrifuges employing perforated drums and an improved method of operating same.

In the aforementioned copending application, we disclose a centrifuge whose basket or perforated drum is rotated about a substantially vertical axis and diverges conically upwardly to communicate at its upper or discharge end with an outer housing compartment for collecting a solid centrifugate. The basket or drum is surrounded by an inner compartment for collecting the mother liquor. The invention set forth in the earlier application is an improvement over centrifuges generally known for the recovery of a solid material from a heterogeneous mixture or for improving (e.g. concentrating) such mixtures. Such centrifuges have found particular application in the sugar industry for the separation of sugar crystals from a mother liquor or molasses in a syrup in which crystallization has commenced. The mother liquor is forced through the perforations of the drum and accumulated in one compartment while the solid material passes over the lip of the drum for accumulation in another housing compartment. It has been pointed out in the copending application that it is frequently desirable to treat at least the portion of the solid material adapted to pass over the lip of the discharge end of the centrifuge drum with a so-called "cover" fluid. In the sugar industry this cover fluid serves both as a carrier and a treating agent, being generally water in the vapor or liquid state. It is, however, convenient to admix with the treating fluid, a bleaching agent or the like as required.

While conventional centrifuges of the aforedescribed type have indeed been used to a considerable extent in the chemical process industries, their use has effectively been limited to the separation of components in a fluid mixture, with only minimum success being attained in the treatment of the separated components. It is well-known, for example, that the operation efficiency of a centrifuge of this type is proportional to the distance along the centrifuge drum over which the solid component must be conveyed. Additionally, effective treatment of the solid component with a fluid, e.g. water, is conditioned upon a sufficiently long path during which the treating fluid remains in contact with the solid material. Furthermore, said treatment of the solid material requires a thorough mixing of the treated material with the fluid. In practice, therefore, it has been possible heretofore to employ continuous centrifuges for rough separation of components from a heterogeneous mass, other means being employed to treat the solid component and produce high-quality sugars and sugar solutions. There have been attempts to increase substantially the centrifuge path by using relatively deep baskets or drums with separation of the components at the lower end of the drum and treatment of the solid material centrifugally displaced along the inner surface of the drum with a fluid at an intermediate location therealong. These efforts were, for the most part, failures since they resulted in centrifuges of unwieldy heights especially if the drive motor was mounted directly below the centrifuge basket and did not insure a wet mixing of the solid component with the treating fluid. Such mixing was not markedly increased by the provision of ridges and recesses along the interior wall of the centrifuge. The importance of such mixing, while apparent to those skilled in the industry, can be emphasized by noting that a major function of treating fluid (e.g. the water employed with sugar crystals) is to remove so-called "ash" from the crystals, an operation requiring prolonged contact times even with agitation. Another disadvantage of earlier attempts to improve the treating capacity of continuous centrifuges, is that almost invariably an excessive amount of treating fluid is required.

It is an object of the present invention to provide the continuous centrifuge wherein some of the developments disclosed in our aforementioned copending application are extended to provide more efficient centrifuge operation and the indicated disadvantages are avoided.

Another object of this invention is to provide a method of operating a continuous centrifuge whereby a solid centrifugate can be efficiently treated with a fluid.

Still another object of our invention is to provide an improved centrifuge having a relatively large effective centrifuge path without substantial increase in height when compared with conventional centrifuges.

A further object of the invention is to provide a centrifuge wherein thorough mixing of the centrifugate with a treating fluid is insured.

These objects and others which will become more readily apparent hereinafter, are attained in accordance with the present invention by providing a method of operating a centrifuge for the continuous separation of a solid material from liquid material in a fluent mixture whereby the mixture is introduced into the interior of a rotating, generally conical and preferably perforated centrifuge drum so that at least part of the solid component is conveyed along the interior of the drum by centrifugal force to an outlet end thereof for discharge outwardly with respect to the axis of rotation of the drum; the outwardly discharged material is then intercepted by a further generally conical drum rotated concurrently with the first-mentioned drum about its axis. According to a significant feature of the present invention the further drum diverges axially in a direction opposite to that of the divergence of the first drum to provide a zig-zag path for the solid centrifugate when viewed in axial cross-section.

When the centrifuge is to be employed for the treatment of the solid material with a fluid, this fluid is applied to the solid material adjacent the outlet end of an inner drum so that it is carried with the outwardly displaced material onto an outer drum and thoroughly mixed with this material in the process. It is clear that the fluid will remain in contact with the solid material for the duration of its passage along the second or outer drum and that additional drums can be provided in zig-zag configuration to increase the contact path. The liquid component, centrifugally forced through the perforations in the inner or outer drums, can be connected in the usual manner for further concentration and extraction of solid material. It is preferred, however, to treat fluid centrifugally extracted from the solid material in the outer drum and to return it to an inner drum for treatment of an additional quantity of the solid material. This procedure can be followed until the concentration of the solid component dissolved in the treating fluid attains a predetermined maximum value. This method insures thorough treatment of the solid material and, since it does not require a basket of considerable depth, permits centrifugation with a minimum of vibration and other difficulties.

According to another aspect of the present invention, the centrifuge comprises a housing in which the first or inner centrifuge drum is journaled for rotation about its axis and diverges therealong to form an outlet end. At least one but preferably a plurality of further conical drums are coaxially mounted for rotation about the axis of the first drum, these further drums alternatively diverging axially in directions opposite the direction of divergence of the first drum and in the latter direction successively outwardly from the latter. Each of the outer drums is positioned to intercept material discharged centrifugally outwardly by the adjacent inner drum so that the solid component travels along the aforedescribed zigzag path in an axial cross-section of the centrifuge. It is a more specific feature of our invention that one or more of the outer drums or even a part thereof is free from perforations so that elimination of liquid (e.g. a treating fluid) in these regions is prevented. It will be apparent that this arrangement increases the duration of contact of the treating fluid with the solid component.

Advantageously, all of the aforementioned centrifuge drums or baskets are provided with a common drive means for joint rotation in the same sense about the centrifuge axis. More particularly, the drive means can include a disk upon which all of the drums or at least the outer drums are mounted, this disk extending generally transversely to the axis of rotation and being provided with a drive shaft for rotation of the drums. The disk is of importance since it insures a relatively compact relationship of the successively outwardly drums. It should be noted at this juncture that the disk can also carry collecting means interposed between a pair of adjacent drums and associated with a perforated drum for diverting therefrom centrifugally extracted liquid. In this case, the disk is provided with one or more outlets through which the extracted liquid can pass into storage compartments aligned therewith in the housing. The collecting means can include walls forming a chamber around the respective perforate portion of the drum. It may also be pointed out that the various drums can differ from one another in several respects, i.e. be provided with perforate and imperforate zones, be of different conicity (having different apex angles or inclination to the plane of the support disk) or be formed with apertures of different size for discriminating between the components forced through the drum.

While the drive means can include a transmission for connecting the aforementioned drive shaft with a motor remote therefrom as described in our copending application noted above, we prefer to employ a motor mounted directly upon the drive shaft so that, for example, its armature is directly carried thereby. The disk, for best results, is of decreasing thickness outwardly from the axis of the centrifuge with either a continuous taper or a stepped configuration.

The inlet means serving to feed the mixture to the interior of the first or inner drum can include a cup-shaped receptacle recessed in the disk and opening at the interior wall of the inner drum. The receptacle, which imparts an initial acceleration to the mixture to be separated, can have a cylindrical configuration or may be concave or convex in the direction of the inner drum. The concavity or convexity of the receptacle can, of course, be of conical configuration. The housing is preferably subdivided into a plurality of compartments each associated with a respective collecting means of the disk from which the mother liquor can be withdrawn at an inner compartment, the treating fluid at an intermediate compartment and solid material from which most liquid has been separated at the outermost compartment. While it is desirable to insure thorough mixing of the solid material with the fluid, as indicated earlier, it has been discovered that best results are obtained when interference with the smooth passage of the solid material and the treating fluid from one drum to another is eliminated. Consequently, we provide each of the drums with a transition portion concave in the direction of the outlet end of an adjacent drum and radially aligned therewith for providing an interruption-free transfer of material. The discharge end of each drum can be provided with a radially extending lip, if desired to further insure smooth transfer.

A more specific feature of this invention resides in the provision of treating means for contacting the solid component with a treating fluid (e.g. water or a bleaching agent in the case of sugar crystals) adjacent the discharge or outlet end of an inner drum. Preferably, the treating means is arranged in the upper third of this inner drum so that some contact of the solid material with the fluid in this drum is guaranteed. To avoid any undue agitation of the solid material on the surface of the inner drum, the treating means advantageously includes nozzle means rotatable concurrently with the drum at the angular velocity thereof so that the fluid forms a blanketing layer upon the solid material.

The above and other objects, features and advantages of the present invention will become more readily apparent from the following description, reference being made to the appended drawing in which.

Figure 1:
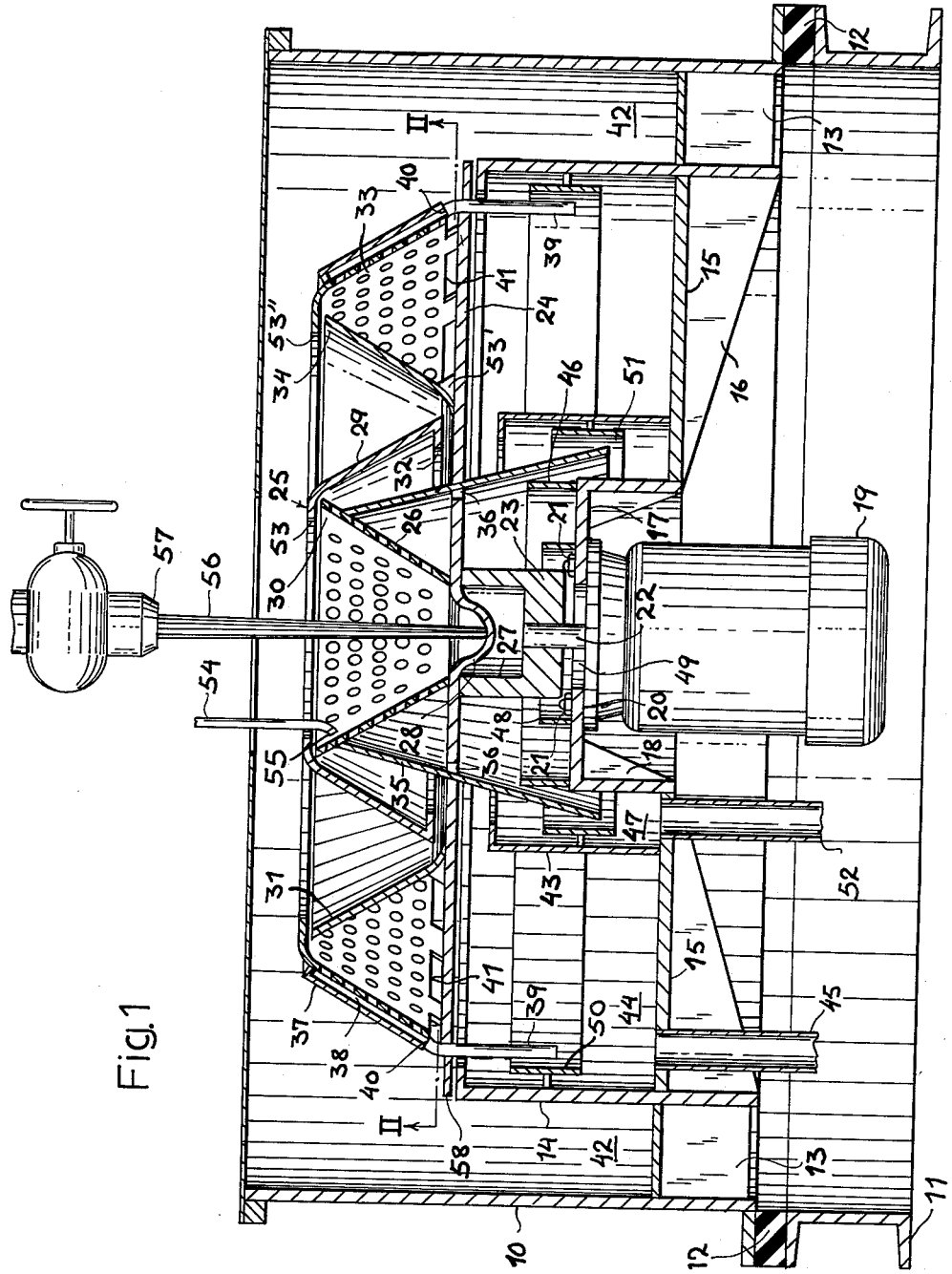
FIG. 1 is an axial cross-sectional view through a sugar centrifuge according to the invention.
Figure 2:
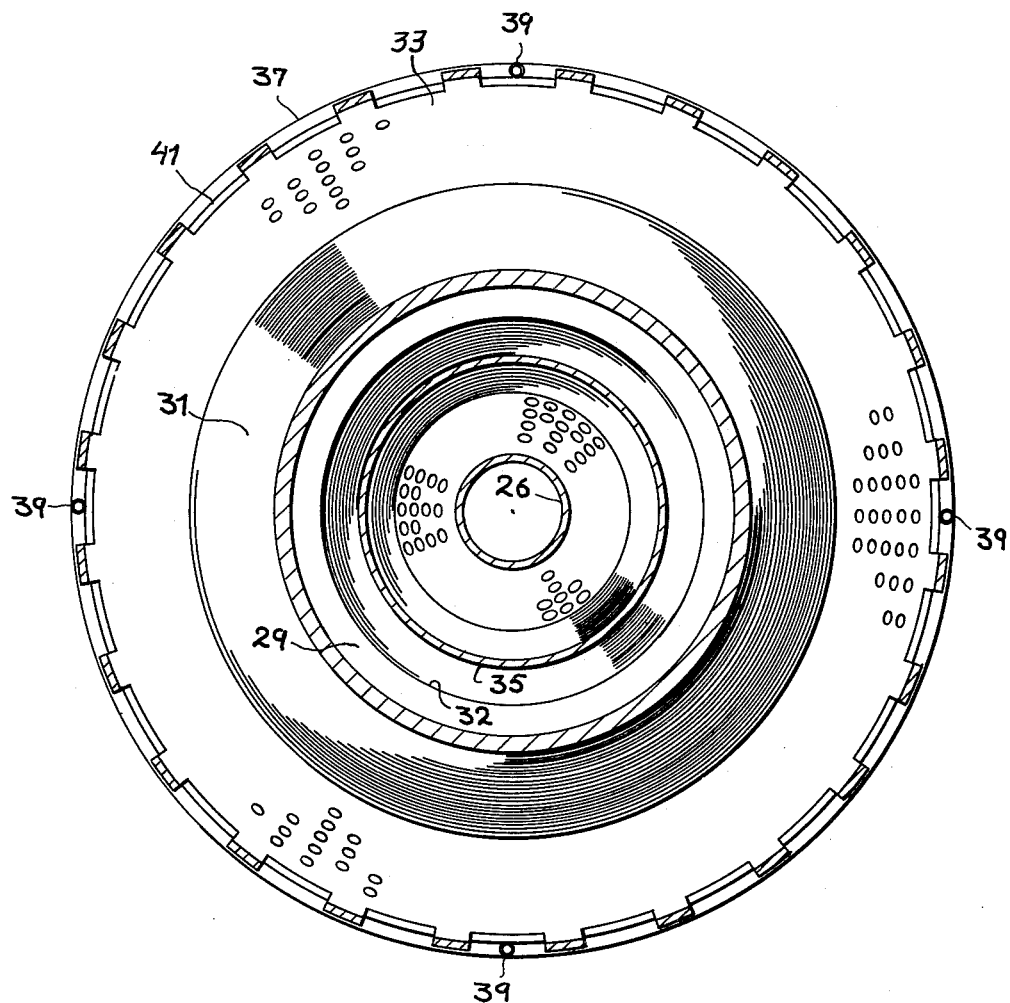
FIG. 2 is a cross-sectional view taken along the line II—II of FIG. 1.

The centrifuge apparatus of FIGS. 1 and 2 comprises a housing 10 which is mounted upon a base 11 by vibration-absorbing resilient members 12. Ribs 13 angularly spaced about the axis of the centrifuge carry an outer annular vertical partition 14 which, in turn, is welded to a bottom plate 15 whose triangular ribs 16 serve as reinforcements. This bottom plate has a central portion 17, reinforced by ribs 18 upon which is mounted a motor 19 via its flange 20 and bolts 21. The drive shaft 22 of motor 19 carries the hub 23 of a support disk 24 extending generally transversely to the centrifuge axis.

Disk 24 supports the centrifuge-basket system generally designated 25 and consisting of a first or inner perforated centrifuge drum 26 which can be reinforced as described in detail in our above-identified copending application. Drum 26 diverges upwardly from the hub portion 23 of disk 24, this hub portion being recessed to form part of the inlet means feeding the heterogeneous mixture to this drum. As shown in FIG. 1, the recess 27 of the hub 23 receives a cup-shaped receptacle 28 which opens in the direction of drum 26. It will be readily apparent that the receptacle 28 need not be separate from disk 24 and can, in fact, be formed directly in the latter. Outwardly of drum 26, there is provided a downwardly divergent imperforate discharge drum 29 spaced outwardly from the outlet end 30 of drum 26. An upwardly diverging drum 31, also not perforated, is positioned to intercept material from the outlet end 32 of drum 29 while, at the marginal portion of disk 24, an outermost perforated drum 33 intercepts material from the outer end 34 of drum 31. As can be readily appreciated from the drawing, drums 29, 31 and 33 diverge alternately in opposite directions and form zig-zag paths for the solid component.

The disk 24 also carries a collecting wall 35 which diverts liquid forced through the apertures of drum 26 downwardly through outlet 36, formed in this disk, into a collecting chamber to be described subsequently. Similarly, the outermost drum 33 is provided with a collecting mantle 37 forming with the outer surface of this drum a chamber 38 into which liquid forced through the apertures in the drum penetrates. From this chamber 38, a plurality of tubes 39, communicating with chamber 38 via outlets 40, depend for conducting liquid away from this drum. The solid material thus separated from the liquid, passes through slots 41 at the base of drum 33 into the sugar compartment 42 between the housing 10 and partition 14. The sugar crystals can be removed by conventional means through the open mouth of housing 10. Another wall 43 defines with partition 14 and the floor 15 a compartment 44 into which the tubes 39 empty recovered liquid. The latter can be removed from compartment 44 by means of a pipe 45 and returned to an earlier stage of the centrifuge process as will be described subsequently. Partition 43 forms with a further wall 46 another compartment 47 into which the collecting means 35 empties. A protective wall 48 surrounds the aperture 49 in plate 17 through which the shaft 22 passes to prevent contamination of the motor and its seals. Annular splash-preventing plates 50 and 51 are provided adjacent the outlet ends of tubes 39 and connecting wall 35 respectively. Another pipe 52 serves to remove liquid from compartment 47. To effect a smooth transition of material from an inner drum to an outer drum, each of the drums is formed with a transfer portion 53, 53', 53" concave in the direction of the adjacent inner drum and radially aligned with the discharge end thereof for effecting an uninterrupted flow of material from one drum to the other. A conduit 54 with a nozzle 55 covers the solid material with a treating fluid, such as water or a bleaching agent in the case of sugar processing centrifuges.

In operation, a continuous stream 56 of the heterogeneous mixture to be processed cascades from a heated nozzle 57 onto the upwardly concave distributing receptacle 28 which accelerates the mixture and feeds it to the walls of drum 26. The mother liquor is forced through the perforations of the drum by centrifugal force and then passes via outlet 6 into the collecting compartment 47 from which it may be drawn from time to time by suitable valve means (not shown) for further concentration. For further processing the sugar crystals, freed from the major part of the mother liquor, travel upwardly along drum 26 whereupon they encounter the treating fluid dispensed by nozzle 55. The solid material together with the treating fluid is then discharged generally tangentially from drum 26 at its outlet end 30 and is intercepted by imperforate drum 29. As the solid material travels downwardly along this drum, the treating fluid is able to penetrate it and work thoroughly upon it. The solid material then transfers by centrifugal force to the next drum 31 from whence it passes on the drum 33 in which the treating fluid is forced through the apertures of the drum into chamber 38 for collection in compartment 44. The treating fluid can be recirculated to tube 54 until the concentration of dissolved solids therein reached a predetermined value. The sugar crystals, displaced downwardly along drum 33, pass through openings 41 onto the apron 58 of disk 24 and thus proceed into the sugar-collecting compartment 42. As will be apparent, disk 24 is stepped (hub 23, apron 58) to be of decreasing thickness outwardly from the axis of the centrifuge while the armature of motor 19 is mounted directly upon shaft 22. Drums 26, 29, 31 and 33 are merely representative of any desirable number of drums and can include any effective angle with the disk. Best results are obtained, however, when angles of 15-40° are observed.

Figure 3:
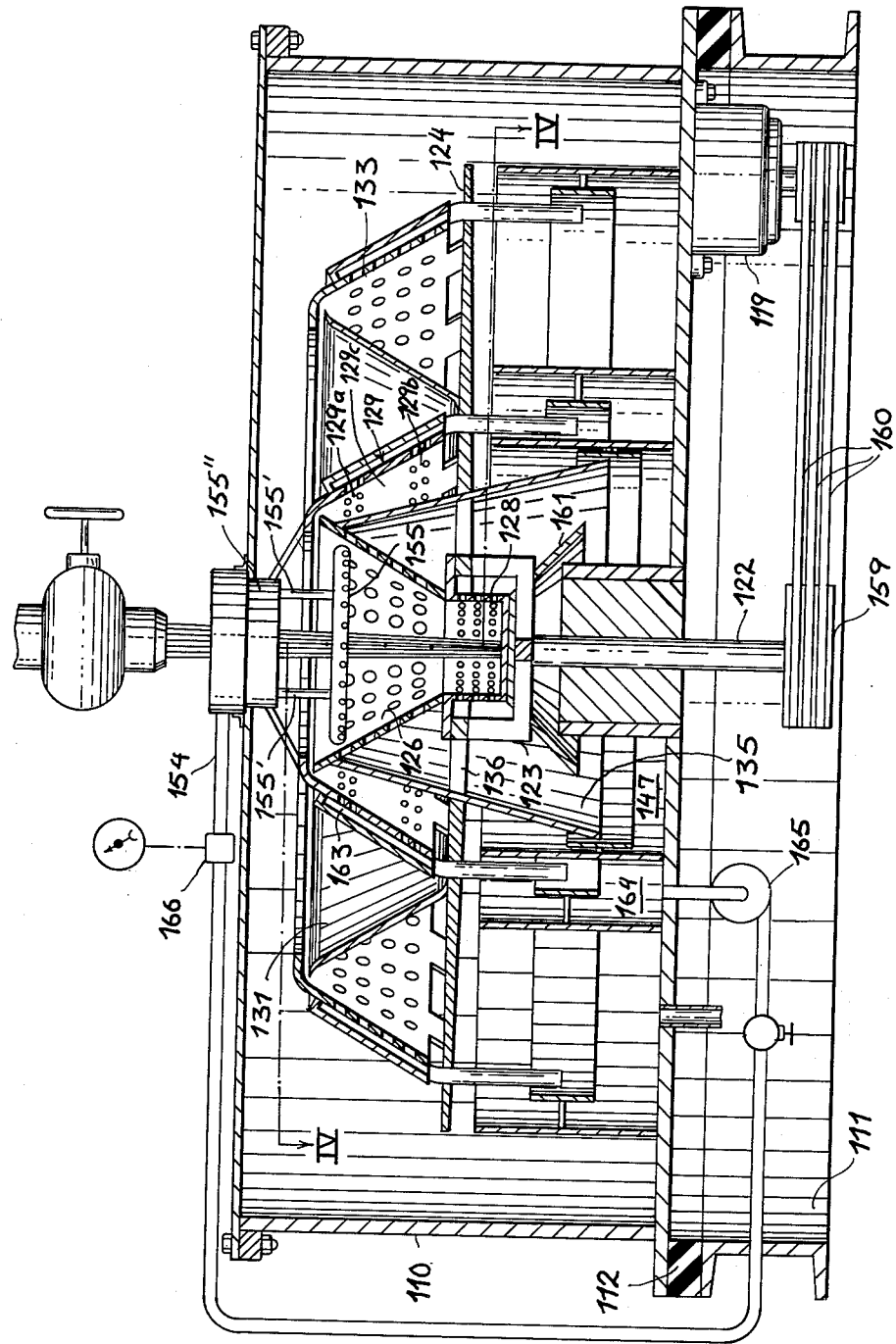
FIG. 3 is a view similar to FIG. 1 illustrating a modified centrifuge.
Figure 4:
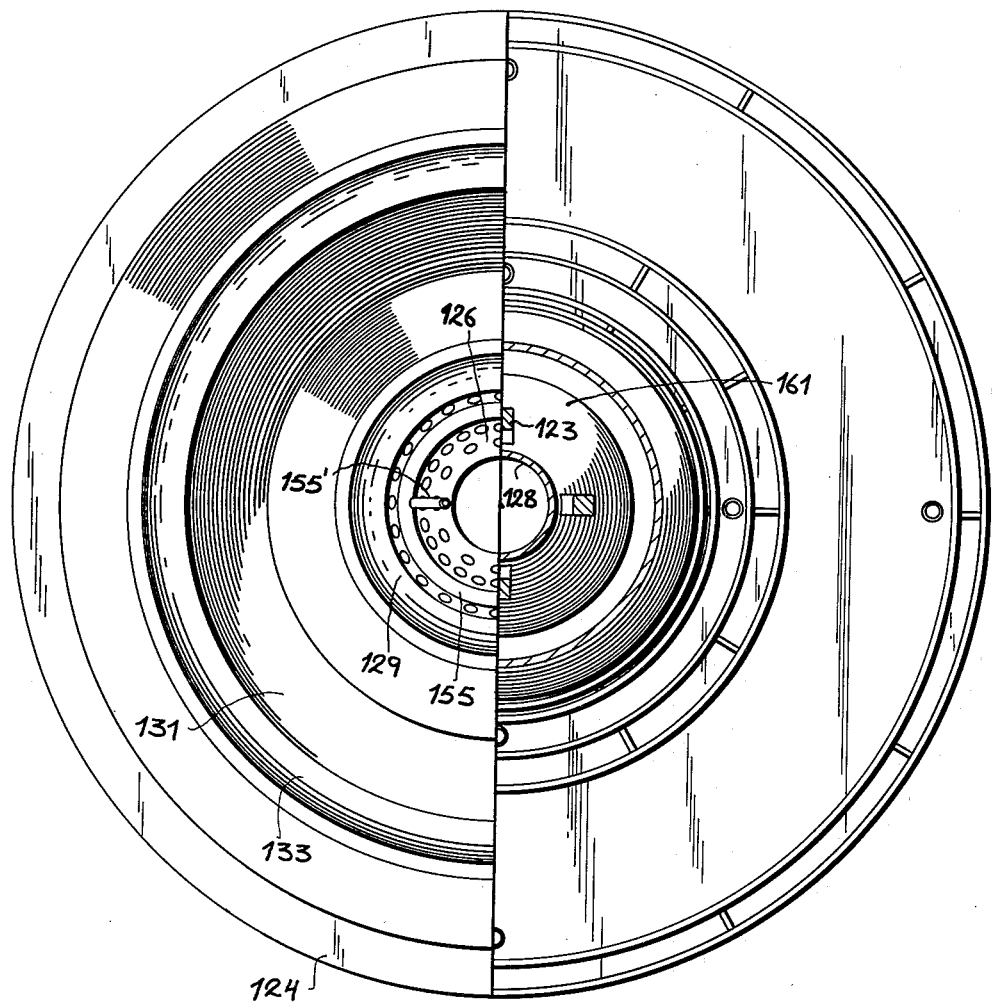
FIGURE 4 is a cross-sectional view taken along the line IV—IV of FIG. 3.

In FIGS. 3 and 4 we show a modified centrifuge wherein the shaft 122 is journaled on the base 111 which supports the housing 110 via rubber cushions 112. Shaft 122, in this case, carries a pulley 159 connected via belts 160 of a transmission to the electromotor 119. The transmission can be of the type shown in detail in the aforementioned copending application. Shaft 122 is provided with a spider 123 for supporting the disk 124 which tapers continuously in thickness outwardly from the spider 123. A conical apron 161 prevents passage of liquid into the bearing of shaft 122. In the present embodiment the imperforate receptacle 28 is replaced by a perforated accelerating cup 128 in which an initial separation of solid from liquid takes place. The remaining slurry then passes upwardly on the drum 126 wherein the mother liquor is forced through perforations and conducted via a connecting wall 135 through openings 136 in plate 124 into a compartment 147. The remaining solid material passes upwardly into the path of treating fluid emanating from an annular nozzle 155 whose ducts 155' connecting with a distributing head 155" fed by tube 154 and rotatable with drum 126. The solid material and the treating fluid then pass on to the adjacent drum 129 which, in this case, is formed with two perforated bands 129a, 129b whose apertures have much smaller diameters than those of drum 126 and wherein only a fraction of the treating fluid is removed. Intermediate these perforated bands is an imperforate zone 129c in traversing which no fluid is removed. The fluid passing through the perforations of drum 129 is collected in a chamber 163 and stored in compartment 164. The solid material passes on to drum 131 for further contact with the treating fluid and then onto drum 133 wherein the treating fluid is removed as previously described. A pump 165 conveys recovered treating fluid to duct 154 via an in-flow sensing device 166 responsive to the concentration of solids dissolved in the treating liquid. When this concentration reaches a predetermined value, circulation of the treating fluid is halted and the exhausted treating fluid subjected to recovery operations. In other respects, however, the apparatus of FIG. 3 functions similarly to that of FIG. 1.

We claim:
1. A sugar-recovery centrifuge for the separation of solid material from liquid material in a fluent mixture, comprising a housing; a first generally conical centrifuge drum journaled in said housing for rotation about a substantially vertical axis and diverging upwardly therealong toward an outlet end of said drum; a plurality of further generally conical centrifuge drums journaled in said housing and coupled therewith for rotation coaxially with said first drum successively outwardly thereof, said further drums alternately diverging downwardly and upwardly successively outwardly from said first drum, each of said further drums being radially spaced from and positioned to intercept free-flying material discharged centrifugally outwardly by an adjacent inner drum, at least said first drum and one of said further drums being perforated; collecting means for diverting liquid material forced through said first and said one of said further drums away therefrom, said collecting means including an apron surrounding said first drum; inlet means for supplying said mixture to the interior of said first drum; common drive means for jointly rotating said drums in the same sense about said axis, and nozzle means disposed between said outlet end of said first drum and a location substantially one-third its axial height therebelow for directing a stream of liquid against solid material ascending said first drum and treating said material with a liquid concurrently with discharge.

2. A centrifuge as defined in claim 1, further comprising a single common support disk extending in a plane transverse to said axis for all of said drums, each of said drums and said apron being mounted on said disk, said disk being provided with outlet means assigned to said collecting means for conducting liquid collected thereby away from said drums, said drive means including a shaft extending along said axis and secured to said shaft for rotating same, and partition means in said housing forming compartments for receiving material separated from said mixture, at least one of said compartments being aligned with said outlet means.

3. A centrifuge as defined in claim 2 wherein said inlet means includes a central receptacle within said first drum recessed in said disk for feeding said mixture onto the interior wall of said first drum, and means for depositing said mixture in said receptacle.

4. A centrifuge as defined in claim 2 wherein said disk is integral and decreases in thickness outwardly from said axis.

5. A sugar-recovery centrifuge for the separation of solid material from liquid material in a fluent mixture, comprising a housing; a first generally conical centrifuge drum journaled in said housing for rotation about its axis and diverging in one direction therealong toward an outlet end of said drum; a plurality of further generally conical centrifuge drums journaled in said housing for rotation coaxial with said first drum successively outwardly thereof, said further drums alternately diverging axially in directions opposite said one direction and in said one direction successively outwardly from said first drum, each of said further drums being positioned to intercept free-flying material discharged centrifugally outwardly by an adjacent inner drum, at least said first drum and one of said further drums being perforated; respective collecting means for diverting liquid material forced through said first and said one of said further drums away therefrom; inlet means for supplying said mixture to the interior of said first drum; drive means for jointly rotating said drums in the same sense about said axis; and nozzle means for directing a stream of fluid at the material traversing said first drum only over at most one-third of its axial length adjacent its discharge end and thereby subjecting the material discharged from said first drum to contact with a treating fluid at the discharge end thereof.

6. A centrifuge as defined in claim 5 wherein the collecting means associated with said one of said further drums is provided with conduit means for returning treating fluid to said treating means.

7. A sugar-recovery centrifuge for the separation of solid material from liquid material in a fluent mixture, comprising a housing; a first generally conical centrifuge drum journaled in said housing for rotation about its axis and diverging in one direction therealong toward an outlet end of said drum; a plurality of further generally conical centrifuge drums journaled in said housing for rotation coaxial with said first drum successively outwardly thereof, said further drums alternately diverging axially in directions opposite said one direction and in said one direction successively outwardly from said first drum, each of said further drums being positioned to intercept free-flying material discharged centrifugally outwardly by an adjacent inner drum, at least said first drum and one of said further drums being perforated; respective collecting means for diverting liquid material forced through said first and said one of said further drums away therefrom; inlet means for supplying said mixture to the interior of said first drum; drive means for jointly rotating said drums in the same sense about said axis; and nozzle means for directing a stream of fluid at the material traversing said first drum only over at most one-third of its axial length adjacent its discharge end and thereby subjecting the material discharged from said first drum to contact with a treating fluid at the discharge end thereof, said nozzle means being rotated by said drive means with an angular velocity identical to that of said drums in the same sense.

8. A sugar-recovery centrifuge for the separation of solid material from liquid material in a fluent mixture, comprising a housing; a first generally conical centrifuge drum journaled in said housing for rotation about its axis and diverging in one direction therealong toward an outlet end of said drum; a plurality of further generally conical centrifuge drums journaled in said housing for rotation coaxial with said first drum successively outwardly thereof, said further drums alternately diverging axially in directions opposite said one direction and in said one direction successively outwardly from said first drum, each of said further drums being positioned to intercept free-flying material discharged centrifugally outwardly by an adjacent inner drum, at least said first drum and one of said further drums being perforated; respective collecting means for diverting liquid material forced through said first and said one of said further drums away therefrom; inlet means for supplying said mixture to the interior of said first drum; drive means for jointly rotating said drums in the same sense about said axis; and nozzle means for directing a stream of fluid at the material traversing said first drum only over at most one-third of its axial length adjacent its discharge end and thereby subjecting the material discharged from one of said drums to contact with a treating fluid at the discharge end thereof, each of said further drums being formed with an integral curved annular flange-like transfer portion aligned radially with the discharge end of an adjacent inner drum and concave in the direction but spaced therefrom for effecting a smooth transfer of material from an inner drum to the successively outer drum.

References Cited by the Examiner

UNITED STATES PATENTS

| | | | |
|---|---|---|---|
| 1,156,060 | 10/15 | Coombs | 127—56 |
| 1,839,941 | 1/32 | Zelenzniak | 210—369 X |
| 2,095,206 | 10/37 | Sharples | 210—78 |
| 2,100,118 | 11/37 | Andrews. | |
| 2,688,405 | 9/54 | Sharples | 210—380 X |
| 2,732,073 | 1/56 | Ruegg | 210—215 X |
| 2,899,342 | 8/59 | Buddeberg et al. | 127—56 |
| 2,973,288 | 2/61 | Riedel | 127—56 X |
| 3,123,557 | 3/64 | McPhee et al. | 127—56 X |

MORRIS O. WOLK, *Primary Examiner.*